United States Patent
Hori et al.

(10) Patent No.: US 8,349,142 B2
(45) Date of Patent: Jan. 8, 2013

(54) METHOD FOR PRODUCING GRAPHENE

(75) Inventors: Masaru Hori, Aichi (JP); Hiroyuki Kano, Aichi (JP)

(73) Assignees: Masaru Hori, Nagoya-Shi, Aichi (JP); Nu Eco Engineering Co., Ltd., Nishikamo-Gun, Aichi (JP)

( * ) Notice: Subject to any disclaimer, the term of this patent is extended or adjusted under 35 U.S.C. 154(b) by 218 days.

(21) Appl. No.: 12/736,268

(22) PCT Filed: Mar. 23, 2009

(86) PCT No.: PCT/JP2009/001266
§ 371 (c)(1),
(2), (4) Date: Dec. 8, 2010

(87) PCT Pub. No.: WO2009/119059
PCT Pub. Date: Oct. 1, 2009

(65) Prior Publication Data
US 2011/0114499 A1    May 19, 2011

(30) Foreign Application Priority Data
Mar. 26, 2008  (JP) .................................. 2008-080704

(51) Int. Cl.
*B01J 19/08* (2006.01)
(52) U.S. Cl. .................................... 204/173; 423/445 R
(58) Field of Classification Search .................. 204/173; 423/445 R
See application file for complete search history.

(56) References Cited

U.S. PATENT DOCUMENTS

| 7,244,408 B2 | 7/2007 | Ryzhkov |
| 2007/0184190 A1 | 8/2007 | Hiramatsu et al. |

FOREIGN PATENT DOCUMENTS

| JP | 2005-503989 A | 2/2005 |
| JP | 2005-97113 A | 4/2005 |
| JP | 2005-108600 A | 4/2005 |
| JP | 2005-230753 A | 9/2005 |
| JP | 2005-314162 | 11/2005 |
| JP | 2006-273707 A | 10/2006 |
| WO | 2005/021430 A1 | 3/2005 |
| WO | WO 2005/033007 A1 | 4/2005 |

*Primary Examiner* — Klshor Mayekar
(74) *Attorney, Agent, or Firm* — McGinn IP Law Group, PLLC

(57) ABSTRACT

A graphene production apparatus 100 has a vessel 10 and, attached thereto, an immersion electrode 20 and a non-immersion electrode 30. The immersion electrode has an electrode covering 20c and an electrode main body 20e, and the non-immersion electrode has a covering 30c and an electrode main body 30e. An argon-feeding conduit 40 is disposed so as to inject argon into the vessel 10 around the electrode main body 30e. Ethanol is supplied in such an amount that the liquid surface completely covers the electrode main body 20e of the immersion electrode 20 and does not reach the electrode main body 30e of the non-immersion electrode 30. The electrode main body 20e is formed from, for example, iron, nickel, or cobalt.

10 Claims, 2 Drawing Sheets

US 8,349,142 B2

METHOD FOR PRODUCING GRAPHENE

This application is a U.S. national phase under 35 U.S.C. §371 of International Patent Application No. PCT/JP2009/001266 filed Mar. 23, 2009.

TECHNICAL FIELD

The present invention relates to a process for producing graphene or assembled graphene having a size of 1 to several hundreds of nanometers, or for producing a dispersion thereof. As used herein, the term "graphene" refers to single graphene as well as to assembled graphene such as graphene sheets, stacked graphene sheets, or nano-graphene. That is, the graphene may have any size, and may be any of single graphene, assembled graphene, stacked graphene sheets, or granulated assembled graphene.

BACKGROUND ART

Electric properties of carbon nano-structures having an extensive conjugated π-electron system (e.g. carbon nanotubes) have become of interest. Such carbon materials are envisaged to be developed particularly as high-efficiency electrode materials for use in micro-scale devices, large-scale batteries, etc. Among these devices, fuel cells require an electrode that can incorporate platinum. Therefore, a carbon nanostructure, which readily forms micropowder, is a promising candidate of the electrode.

According to common knowledge, graphene is a single layer isolated from graphite having a multi-layer structure. In other words, graphene has a very extensive conjugated n-electron system and conceivably has a single plane structure, which differs from the structures of other carbon nanostructures. Thus, various theoretical calculations have been conducted in relation to graphene so as to achieve high electrical conductivity from graphene.

Meanwhile, regarding the carbon nanowall production method, Patent Documents 1 and 2 disclose carbon nanowall production techniques which employ plasma. However, there has never been reported a process for producing graphene from liquid material.

Patent Document 1: Japanese Patent Application No. 2005-097113
Patent Document 2: Japanese Sai-Kohyo Patent Publication No. 2005/021430

DISCLOSURE OF THE INVENTION

Problem to be Solved by the Invention

Hitherto, processes for producing graphene, random assemblies of graphene, or graphene micropowder have employed a high-temperature thermal process, a reduced-pressure-plasma technique such as arc discharge, etc. That is, since these conventional processes require a high-temperature heating apparatus or a vacuum evacuation apparatus and chamber, the scale of the production apparatus has problematically increased.

In view of the foregoing, the present inventors have found that graphene can be produced through a remarkably simple process. The present invention has been accomplished on the basis of this finding.

Means for Solving the Problems

In a first aspect of the invention, there is provided a process for producing graphene from a liquid material containing at least an organic compound, characterized in that the process comprises:

disposing a pair of electrodes such that a first electrode is immersed in the liquid material, that a second electrode is placed above the liquid material, and that the two electrodes oppose each other with the gas-liquid interface;

applying AC voltage between said pair of electrodes, to thereby generate a plasma across the gas-liquid interface; and decomposing the organic compound by the plasma, wherein a graphene dispersion in which graphene is dispersed in the liquid material is produced.

A second aspect of the invention is directed to a specific embodiment of the production process, wherein the liquid material produced through the invention of claim 1 is dried to thereby form graphene powder.

A third aspect of the invention is directed to a specific embodiment of the production process, wherein the organic compound has an alcoholic hydroxyl group.

A fourth aspect of the invention is directed to a specific embodiment of the production process, wherein the organic compound is a C≦5 alcohol, diol, or triol.

A fifth aspect of the invention is directed to a specific embodiment of the production process, wherein the organic compound is methanol, ethanol, or 1- or 2-propanol.

A sixth aspect of the invention is directed to a specific embodiment of the production process, wherein the two electrodes are disposed such that the first electrode immersed in the liquid material has an electric discharge surface which is apart from the gas-liquid interface by a distance of 5 mm or less, and the second electrode placed above the liquid material has an electric discharge surface which is apart from the gas-liquid interface by a distance of 20 mm or less.

A seventh aspect of the invention is directed to a specific embodiment of the production process, wherein the ratio of the distance between the electric discharge surface of the first electrode immersed in the liquid material and the gas-liquid interface to the distance between the electric discharge surface of the second electrode placed above the liquid material and the gas-liquid interface is 1:2 to 1:3.

Effects of the Invention

The production process found by the present inventors can be carried out at room temperature under atmospheric conditions and requires no high-temperature heating apparatus or high-frequency power source. In addition, since the process of the invention employs, as a carbon source, a liquid organic compound or a liquid containing an organic compound, feeding of the carbon source can be performed in a remarkably easy manner, as compared with a plasma-generator having an evacuation apparatus. Furthermore, since the thus-formed graphene can be dispersed in the raw material; i.e., the aforementioned liquid organic compound or liquid containing an organic compound, a graphene dispersion can be obtained without performing any additional step. In the case where the aforementioned liquid organic compound or liquid containing an organic compound serving as a raw material is formed of only a low-boiling point compound, a graphene powder can be readily formed through drying.

Among organic substances, a molecule having an alcoholic hydroxyl group is preferred, since a carbon-carbon double bond is readily formed in the original skeleton of the molecule after decomposition of the molecule and release of the alcoholic hydroxyl group. Among them, low-boiling-point alcohols are particularly preferred. Needless to say, a mixture of low-boiling point alcohol and another organic solvent may be employed.

BEST MODES FOR CARRYING OUT THE INVENTION

The present invention will next be described in detail by way of example, with reference to the drawings.

EXAMPLE 1

Figure 1:
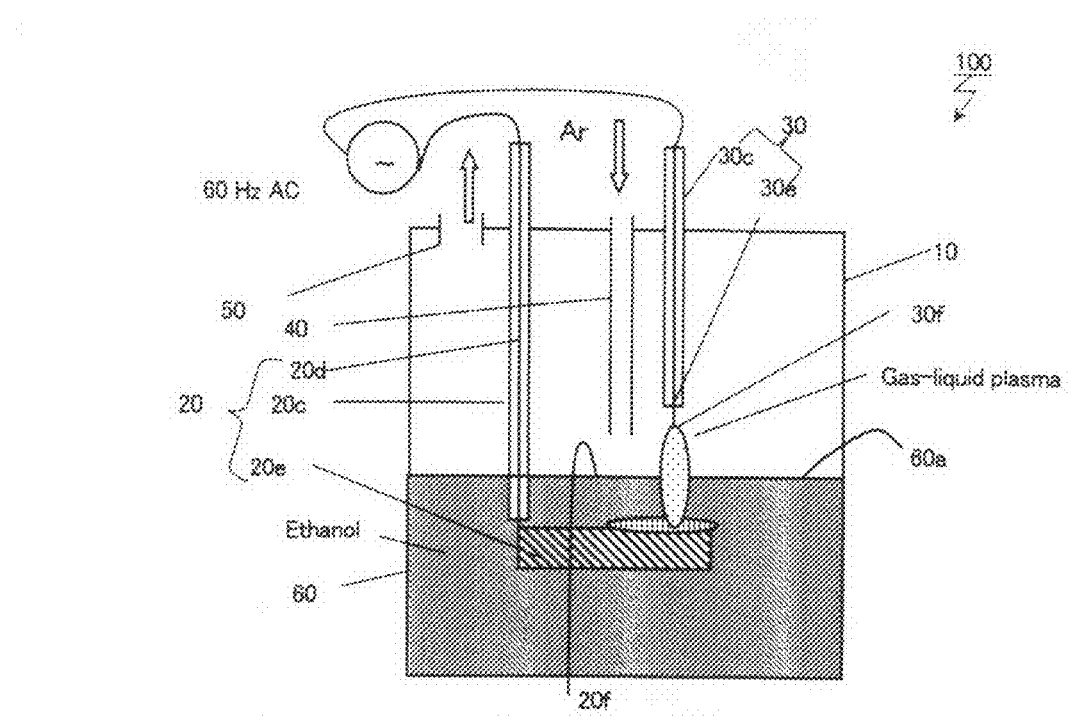
FIG. 1: A cross-section of a graphene production apparatus 100, according a specific embodiment of the present invention.

FIG. 1 is a cross-section (configuration) showing an embodiment of the process for producing graphene according to the present invention. In FIG. 1, a graphene production apparatus 100 is configured by a tightly closable vessel 10, and in the vessel 10, an immersion electrode 20 which is immersed in a liquid material 60 formed of ethanol, and a non-immersion electrode 30 which is placed above the liquid material 60. The immersion electrode 20 has a plate-like electrode main body 20e for applying voltage, a lead wire 20d for passing electricity to the main body, and a cylindrical electrode covering 20c covering the surroundings of the lead wire 20d. The non-immersion electrode 30 has a wire-like electrode main body 30e for applying voltage, and a cylindrical electrode covering 30c covering the surroundings thereof. The electrode main body 30e has an electrode tip 30f, which is exposed from the electrode covering 30c toward the liquid surface 60a (i.e., the gas-liquid interface) of the liquid material 60. The graphene production apparatus 100 is provided with an argon-feeding conduit 40 and a discharge outlet 50. The argon-feeding conduit 40 is disposed so as to inject argon to a space in the vicinity of the tip 30f of the electrode main body 30e exposed from the non-immersion electrode 30 in the vessel 10.

To the graphene production apparatus 100, ethanol is fed so that the liquid surface 60a of ethanol completely covers the entirety of the electrode main body 20e of the immersion electrode 20, and so that the liquid surface 60a does not come into contact with the tip 30f of the electrode main body 30e of the non-immersion electrode 30. The electrode main body 20e is formed from, for example, iron, nickel, or cobalt. Then, while argon is supplied through the argon-feeding conduit 40, an AC voltage (60 Hz) is applied between the surface 20f (electric discharge surface) of the electrode main body 20e located inside the liquid and the tip 30f (electric discharge surface) of the electrode main body 30e located above the liquid. In this case, the liquid surface 60a of ethanol (gas-liquid interface) is present between the two discharge surfaces. Through elevation of the voltage, a gas-liquid plasma is generated between the surface 20f of the electrode main body 20e and the tip 30f of the electrode main body 30e above the liquid. By the action of plasma, ethanol is decomposed or undergoes other processes, to thereby form graphene. The thus-formed graphene is dispersed in ethanol; i.e., the liquid material 60.

Figure 2:
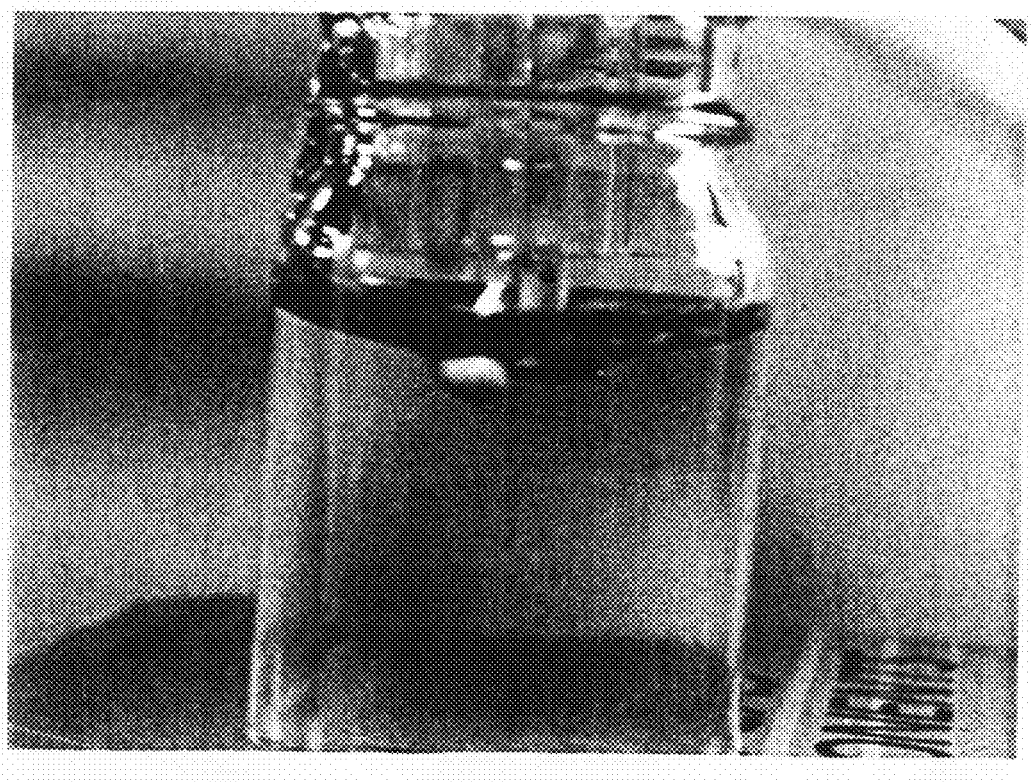
FIG. 2: A photograph of the graphene production apparatus 100 in operation.

FIG. 2 is a photograph of the graphene production apparatus 100 shown in FIG. 1 in an actual operation state. As shown in FIG. 2, bubble-like portions observed in the vicinity of the liquid surface of ethanol correspond to portions where gas-liquid plasma is generated. In further observation, ethanol gradually became brown, indicating that the reaction product is dispersed in the liquid.

Figure 3:
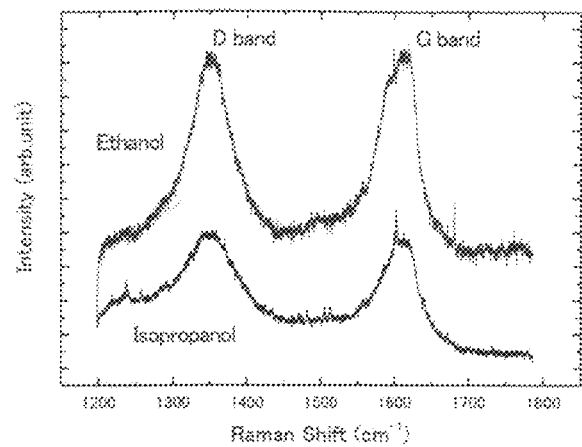
FIG. 3: A chart of Raman spectra of the graphene powder produced in the Example.

The graphene produced by means of the graphene production apparatus 100 shown in FIG. 1 is subjected to vaporization, whereby ethanol employed as a carbon source is removed. A Raman spectrum of the thus-dried powder was measured. FIG. 3 is a chart of Raman spectra of the graphene powder produced in the Example. FIG. 3 shows a Raman spectrum of the graphene produced from ethanol as the carbon source, and that of the graphene produced from 2-propanol. In each spectrum, a D band and a G band are clearly observed, confirming the presence of a graphene structure. Conceivably, the D band is attributed to a conjugated π-electron system of graphene, and the G band is attributed to another structure such as an end portion. Each Raman spectrum indicates that the formed graphene has a small conjugated π-electron system; i.e., each graphene molecule has a small size.

Figure 4:
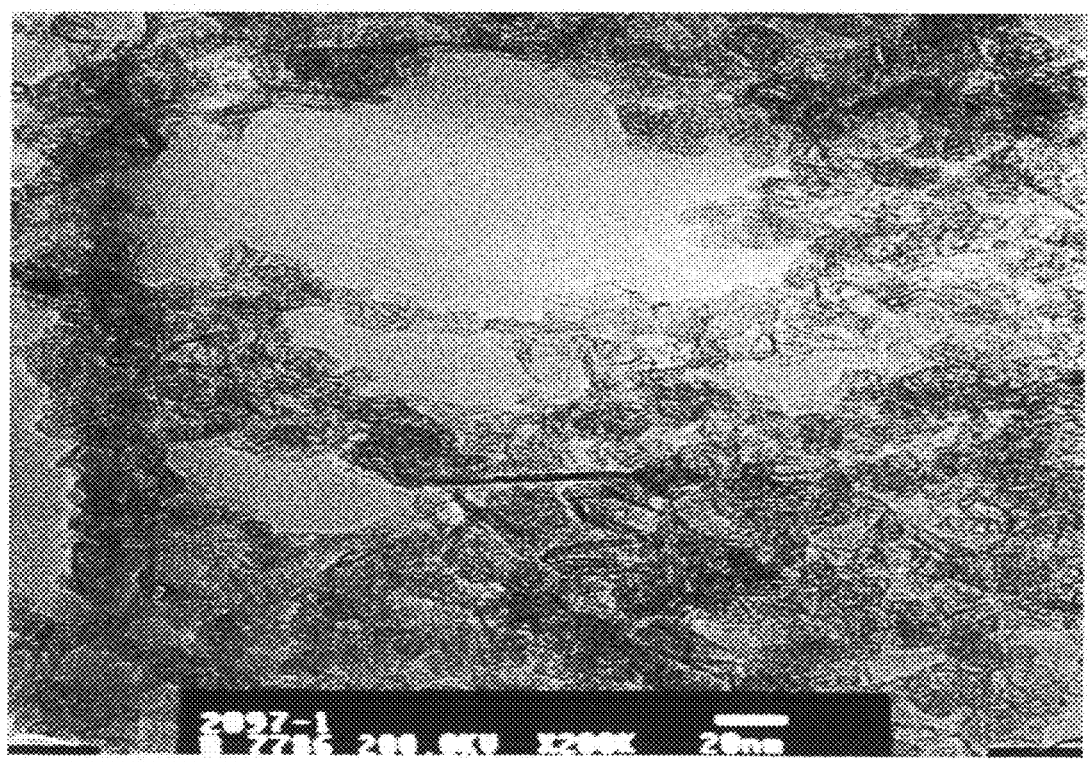
FIG. 4: A transmission electron microscopic photograph of the graphene powder produced in the Example.

FIG. 4 is a transmission electron microscopic photograph of the graphene powder produced from ethanol as a carbon source. As is clear from FIG. 4, the size of graphene is several tens of nanometers.

The organic compound contained in the aforementioned liquid preferably has an alcoholic hydroxyl group. By use of such an organic compound, nano-order graphene can be produced. The organic compound is preferably a alcohol, diol, or triol. The organic compound is more preferably methanol, ethanol, or 1- or 2-propanol. Through employment of any of these organic compounds, nano-order graphene can be produced at high efficiency.

Preferably, the surface 20f of the electrode main body 20e of the immersion electrode 20, which serves as an electric discharge surface, is apart from the gas-liquid interface (i.e., liquid surface 60a) by a distance of 5 mm or less, and the tip 30f of the non-immersion electrode 30, which serves as an electric discharge surface, is apart from the gas-liquid interface (i.e., liquid surface 60a) by a distance of 20 mm or less. When the relationships are satisfied, electric discharge effectively occurs between the surface 20f of the electrode main body 20e and the tip 30f of the non-immersion electrode 30, whereby nano-order graphene can be produced at high efficiency.

When the ratio of the distance between the surface 20f of the electrode main body 20e of the immersion electrode 20 (i.e., electric discharge surface) and the liquid surface 60a (gas-liquid interface) to the distance between the tip 30f of the non-immersion electrode 30 (i.e., electric discharge surface) and the liquid surface 60a (gas-liquid interface) is 1:2 to 1:3, electric discharge effectively occurs between the surface 20f of the electrode main body 20e and the tip 30f of the non-immersion electrode 30, whereby nano-order graphene can be produced at high efficiency. In other words, the distance between the surface 20f of the electrode main body 20e of the immersion electrode 20 (i.e., electric discharge surface) and the liquid surface 60a (gas-liquid interface) is preferably shorter than the distance between the tip 30f of the non-immersion electrode 30 (i.e., electric discharge surface) and the liquid surface 60a (gas-liquid interface).

INDUSTRIAL APPLICABILITY

The graphene dispersion produced according to the present invention can be employed as a conductive coating material and a raw material thereof. Furthermore, graphene powder can be readily produced according to the present invention, and an electrode material can be produced through, for example, firing the graphene powder.

BRIEF DESCRIPTION OF THE DRAWINGS

100: Graphene production apparatus
10: Vessel
20: Immersion electrode
20c: Electrode covering
20e: Electrode main body
30: Non-immersion electrode
30c: Electrode covering
30e: Electrode main body
40: Argon-feeding conduit
50: Argon-discharge outlet

The invention claimed is:

1. A process for producing graphene from a liquid material containing at least an organic compound, wherein the process comprises:
   disposing a pair of electrodes such that a first electrode is immersed in the liquid material, a second electrode is placed above the liquid material, and the two electrodes oppose each other with the gas-liquid interface;
   applying AC voltage between said pair of electrodes, to thereby generate a plasma across the gas-liquid interface; and
   decomposing the organic compound by the plasma, wherein a graphene dispersion in which graphene is dispersed in the liquid material is produced.

2. A process for producing graphene according to claim 1, further comprises drying the graphene dispersion to form a graphene powder.

3. A process for producing graphene according to claim 1, wherein the organic compound has an alcoholic hydroxyl group.

4. A process for producing graphene according to claim 3, wherein the organic compound is a $C \leqq 5$ alcohol, diol, or triol.

5. A process for producing graphene according to claim 4, wherein the organic compound is methanol, ethanol, or 1- or 2-propanol.

6. A process for producing graphene according to claim 2, wherein the organic compound has an alcoholic hydroxyl group.

7. A process for producing graphene according to claim 6, wherein the organic compound is a $C \leqq 5$ alcohol, diol, or triol.

8. A process for producing graphene according to claim 7, wherein the organic compound is methanol, ethanol, or 1- or 2-propanol.

9. A process for producing graphene according to claim 1, wherein the two electrodes are disposed such that the first electrode immersed in the liquid material has an electric discharge surface which is apart from the gas-liquid interface by a distance of 5 mm or less, and the second electrode placed above the liquid material has an electric discharge surface which is apart from the gas-liquid interface by a distance of 20 mm or less.

10. A process for producing graphene according to claim 1, wherein the ratio of a distance between the electric discharge surface of the first electrode immersed in the liquid material and the gas-liquid interface to a distance between the electric discharge surface of the second electrode placed above the liquid material and the gas-liquid interface is 1:2 to 1:3.

* * * * *